United States Patent
Chiang

(10) Patent No.: US 8,792,172 B2
(45) Date of Patent: Jul. 29, 2014

(54) LIGHT GUIDE MEMBER

(75) Inventor: Chia-Chin Chiang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 331 days.

(21) Appl. No.: 12/862,785

(22) Filed: Aug. 25, 2010

(65) Prior Publication Data

US 2012/0008211 A1    Jan. 12, 2012

(30) Foreign Application Priority Data

Jul. 12, 2010  (CN) .......................... 2010 2 0254497

(51) Int. Cl.
*G02B 6/00*    (2006.01)
*G02B 5/02*    (2006.01)

(52) U.S. Cl.
CPC ............ G02B 6/0043 (2013.01); G02B 6/0076 (2013.01); *G02B 6/0066* (2013.01); *G02B 6/0073* (2013.01); *G02B 5/021* (2013.01)
USPC .......................... 359/599; 362/615; 362/623

(58) Field of Classification Search
CPC .... G02B 5/0284; G02B 5/021; G02B 6/0043; G02B 6/0076; G02B 6/0066; G02B 6/0073; G02F 1/133553; G02F 1/133504; G02F 1/133615
USPC .......... 359/599, 443, 452–453; 362/623, 618, 362/615; 349/65
See application file for complete search history.

(56) References Cited

U.S. PATENT DOCUMENTS

| | | | | |
|---|---|---|---|---|
| 5,394,308 A | * | 2/1995 | Watanabe et al. | 349/65 |
| 5,816,677 A | * | 10/1998 | Kurematsu et al. | 362/609 |
| 6,243,150 B1 | * | 6/2001 | Watanabe et al. | 349/65 |
| 6,981,792 B2 | * | 1/2006 | Nagakubo et al. | 362/600 |
| 7,085,060 B2 | * | 8/2006 | Matsushita et al. | 359/599 |
| 7,553,050 B2 | * | 6/2009 | Hwang et al. | 359/599 |
| 2006/0250707 A1 | * | 11/2006 | Whitney et al. | 359/599 |
| 2009/0008625 A1 | * | 1/2009 | Tsai et al. | 257/13 |

* cited by examiner

*Primary Examiner* — Zachary Wilkes
(74) *Attorney, Agent, or Firm* — Novak Druce Connolly Bove + Quigg LLP

(57) ABSTRACT

A light guide member includes a first light guide film, a second light guide film, a diffuser film and an atomization film superposed together one by one. The first light guide film includes a plurality of first light guide dots and the second light guide film includes a plurality of second light guide dots staggered with the plurality of first light guide dots. The plurality of first light guide dots and the plurality of second light guide dots reflect the light towards any directions and then make the light uniformly and brightly emit out from the first light guide film and the second light guide film. The diffuser film controls the luminance and improves the uniformity of the light. The atomization film atomizes the light and solves the problem of visible dots.

6 Claims, 3 Drawing Sheets

LIGHT GUIDE MEMBER

BACKGROUND

1. Technical Field

The present disclosure relates to a light guide member.

2. Description of Related Art

A practical approach to emit uniform light is to utilize a set of electroluminescence (EL) plates or to utilize a light guide film in conjunction with a light emitting diode (LED). However, the set of EL plates are often expensive, and the EL plates have shortages of a short life-span and big noise. To utilize the light guide film in conjunction with the LED has many disadvantages, for example, the luminance and the uniform light cannot be received at the same time, as well as the visible dots cannot be effectively solved.

Therefore, a need exists in the industry to overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
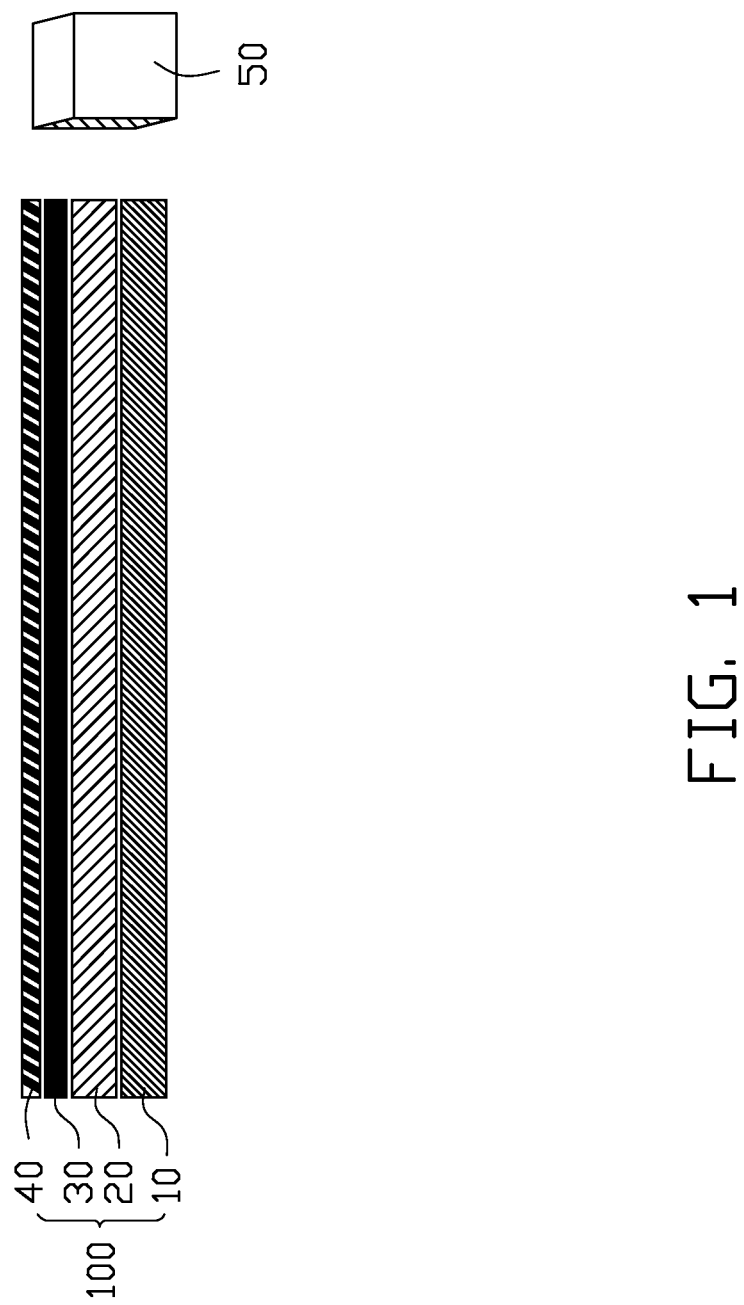
FIG. 1 is a schematic sectional view of one embodiment of a light guide member in accordance with the present disclosure.

Referring to FIG. 1, one embodiment of a light guide member 100 comprises a first light guide film 10, a second light guide film 20, a diffuser film 30 and an atomization film 40 superposed together one by one.

Figure 2:
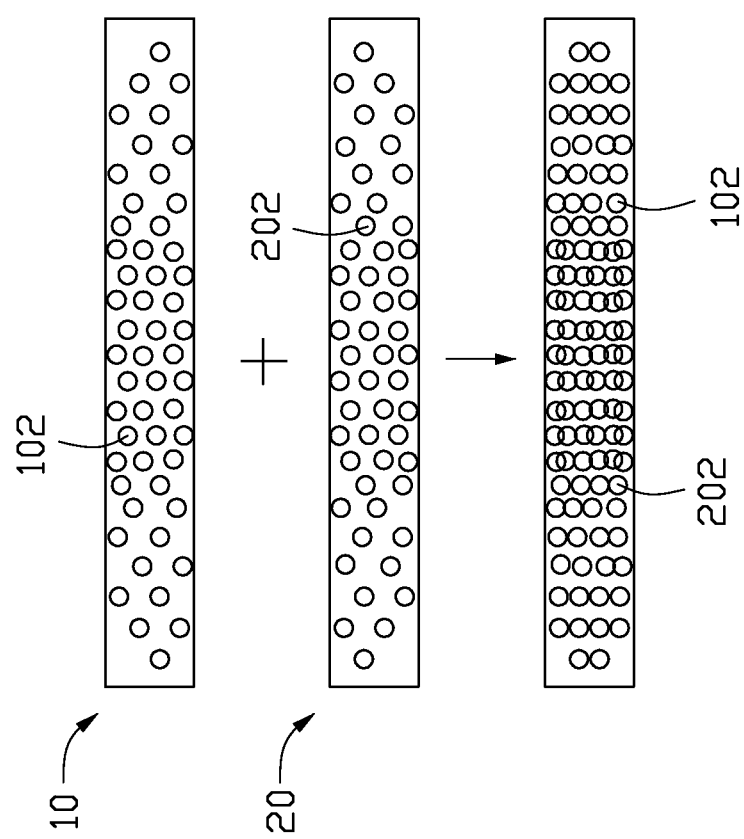
FIG. 2 is a configuration view of one embodiment of a first light guide film and a second light guide film in accordance with the present disclosure.

FIG. 2 is a configuration view of one embodiment of the first light guide film 10 and the second light guide film 20 in accordance with the present disclosure. In one embodiment, the size of the first light guide film 10 is the same as the second light guide film 20. The first light guide film 10 comprises a plurality of first light guide dots 102, and the second light guide film 20 comprises a plurality of second light guide dots 202. In one embodiment, layout of the first light guide dots 102 on the first light guide film 10 is different from that of the second light guide dots 202 on the second light guide film 20. In assembly, the second light guide film 20 is arranged above the first light guide film 10, so that the plurality of first light guide dots 102 are staggered with the plurality of second light guide dots 202.

Referring to FIG. 1, a light source 50 generates light. The plurality of first light guide dots 102 and the plurality of second light guide dots 202 reflect the light towards any direction and then make the light uniformly and brightly emit out from the first light guide film 10 and the second light guide film 20.

Figure 3:
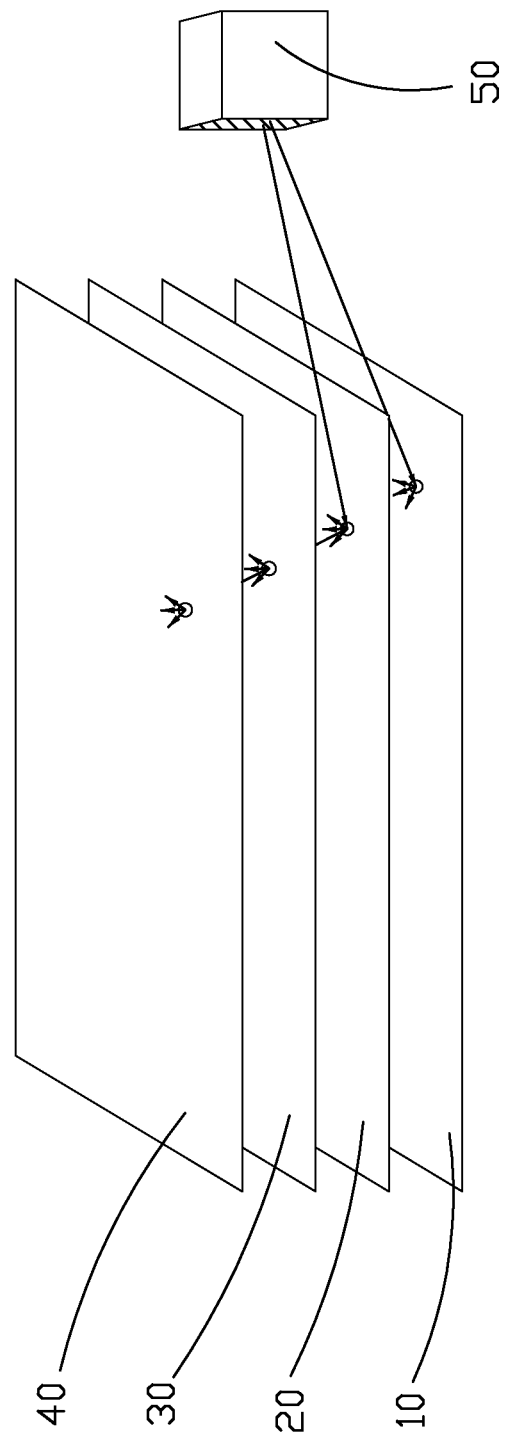
FIG. 3 is a disassembled view of one embodiment of the light guide member in accordance with the present disclosure.

Referring to FIG. 3, the diffuser film 30 is arranged on the second light guide film 20 by an adhesive element, such as optical cement, for example. The diffuser film 30 is made from a base material spread with a diffusing material. The base material can be polyethylene terephthalate (PET) or Polycarbonate (PC). The diffuser film 30 diffuses the light reflected from the second light guide film 20 so as to control the luminance and to improve the uniformity of the light. The atomization film 40 made with Mylar is arranged on the diffuser film 30 to atomize the light and to solve the problem of visible dots.

Referring to FIG. 3, the light generated by the light source 50 is emitted onto the first light guide film 10 and the second light guide film 20. The first light guide dots 102 and second light guide dots 202 reflect the light towards any direction. The light reflected by the first light guide dots 102 transmits through the second light guide film 20 and exits a top of the second light guide film 20. Thus the luminance of the light is brightened by the staggered first light guide dots 102 and second light guide dots 202. The brightened light is emitted onto the diffuser film 30, and the light emerging from the diffuser film 30 is uniform according to the function of the diffuser film 30. The uniform light is emitted onto and atomized by the atomization film 40, so that eventually the atomized light is in uniform luminance without any visible dots.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A light guide member, comprising:
    a first light guide film comprising a plurality of first light guide dots laid out on a top side thereof; and
    a second light guide film superposed on the first light guide film adjacent to the first light guide dots, the second light guide film comprising a plurality of second light guide dots laid out on a top side thereof;
    wherein a light source located beside both a lateral side edge of the first light guide film and a corresponding lateral side edge of the second light guide film illuminates the first light guide dots and the second light guide dots, the first light guide dots and the second light guide dots reflect the light towards any direction, the light reflected by the first light guide dots transmits through the second light guide film and exits the top side of the second light guide film, and thereby the first light guide dots and the second light guide dots brighten a luminance of the light generated from the light source, the brightened light emitted from the light guide member at the top side of the second light guide film; and
    wherein the light illuminating the first light guide dots and the second light guide dots passes only through air from the light source to the first light guide dots and the second light guide dots.

2. The light guide member as claimed in claim 1, further comprising a diffuser film arranged on the second light guide film.

3. The light guide member as claimed in claim 2, further comprising an atomization film arranged on the diffuser film.

4. The light guide member as claimed in claim 1, wherein the first light guide dots and the second light guide dots have a same quantity.

5. The light guide member as claimed in claim 4, wherein the second light guide film is arranged over the first light guide film such that the plurality of first light guide dots are staggered with the plurality of second light guide dots.

6. The light guide member as claimed in claim 1, wherein the second light guide film is arranged over the first light guide film such that the plurality of first light guide dots are staggered with the plurality of second light guide dots.

* * * * *